United States Patent [19]

Mun

[11] Patent Number: 5,382,979
[45] Date of Patent: Jan. 17, 1995

[54] METHOD AND CIRCUIT FOR ADAPTIVELY SELECTING THREE-DIMENSIONAL SUB-BAND IMAGE SIGNAL

[75] Inventor: Hen-Hee Mun, Kyonggi-do, Rep. of Korea

[73] Assignee: Samsung Electronics Co., Ltd., Kyunggki-Do, Rep. of Korea

[21] Appl. No.: 918,616

[22] Filed: Jul. 27, 1992

[30] Foreign Application Priority Data

Jul. 26, 1991 [KR] Rep. of Korea ............ 91-12925

[51] Int. Cl.$^6$ ............................. H04N 7/130
[52] U.S. Cl. ............................. 348/398
[58] Field of Search ............ 358/133, 136; 348/398; H04N 7/130

[56] References Cited

U.S. PATENT DOCUMENTS

| | | | |
|---|---|---|---|
| 4,918,524 | 4/1990 | Ansari et al. | 358/133 |
| 4,943,855 | 7/1990 | Bheda et al. | 358/133 |
| 4,969,040 | 11/1990 | Gharavi | 358/136 |
| 5,021,882 | 6/1991 | Schreiber | 358/133 |
| 5,063,608 | 11/1991 | Siegel | 358/133 |
| 5,121,191 | 6/1992 | Cassereau et al. | 358/133 |
| 5,128,757 | 7/1992 | Citta et al. | 358/133 |
| 5,136,374 | 8/1992 | Jayant et al. | 358/133 |
| 5,214,502 | 5/1993 | Stone et al. | 358/133 |
| 5,220,422 | 6/1993 | Oh | 358/133 |
| 5,231,487 | 7/1993 | Hurley et al. | 358/133 |

Primary Examiner—Howard W. Britton
Assistant Examiner—Richard Lee
Attorney, Agent, or Firm—Sughrue, Mion, Zinn, Macpeak & Seas

[57] ABSTRACT

In an image processing system, an apparatus for adaptively selecting three-dimensional sub-band image signal includes a circuit for obtaining energy of each sub-band of the three-dimensional sub-band signals, a circuit for extracting sub-band information on the basis of activity of higher frequency ones of the sub-band signals, a device for selecting the sub-band signals to be transferred based on a control signal generated from a look-up table in response to the extracted information, and circuitry for restoring the image signal using the selected sub-band signals and the sub-band information. A method for adaptively selecting three-dimensional sub-band signals is also disclosed.

9 Claims, 4 Drawing Sheets

METHOD AND CIRCUIT FOR ADAPTIVELY SELECTING THREE-DIMENSIONAL SUB-BAND IMAGE SIGNAL

BACKGROUND OF THE INVENTION

1. Field of the Invention

The present invention relates to circuit for adaptively selecting three-dimensional sub-band signals of an image signal in an image processing system. More particularly, the present invention relates to a circuit for adaptively selecting three-dimensional sub-band signals of the image signal, which obtains the energy of each band of three-dimensional sub-band signals, extracts sub-band information on the basis of the activity of the higher frequency sub-band signals, selects predetermined ones of the sub-band signals to be transferred from a look-up table in accordance with the extracted information, and restores the original image by using the selected sub-band signals and sub-band information. A method for adaptively selecting three-dimensional sub-band image signal in an image processing system is also disclosed.

2. Description of the Prior Art

With improved techniques for processing digital signals and with advanced techniques for manufacturing elements, such as a semiconductor device embodying such digital signal processing techniques, it is now possible to preferentially digitally transfer the higher frequency image signal components. One method for transferring the image signal is the well known sub-band coding method which divides the image signal into several sub-bands, quantizes the sub-bands on the basis of their signal levels and transfers the quantized sub-band signals. In the sub-band coding method, the lower frequency signal area contains a large amounts of energy while the higher frequency signal area contains a relatively small amount of energy. For this reason, a large number of coding bits are assigned to the lower frequency sub-bands having the high energy while a small number of coding bits are assigned to the higher frequency sub-bands. Theoretically, this should result in a satisfactory coding operation. However, it will be noted that the fine details of an image signal are generally defined over the higher frequency sub-bands.

U.S. Pat. No 4,943,855 entitled "PROGRESSIVE SUB-BAND IMAGE CODING SYSTEM" discloses an image encoder comprising a filter bank for extracting a plurality of sub-band image signals from an input image signal, a coding circuit for encoding the sub-band image signal arbitrarily selected from the sub-band signals so as to remove surplus data contained in the extracted sub-band signal and a preview device for receiving the remaining signals of the sub-band image signals, excluding the extracted sub-band image signal and the signal output from the coding circuit, and for producing a preliminary signal corresponding the remaining sub-band image signals.

In the device constructed according to U.S. Pat. No. 4,943,855, the process of dividing the input image signal into the sub-band image signals and encoding any one of the sub-band image signals using other sub-band signals is repeatedly effected to encode the image signal. More particularly, the circuit divides the sub-band signal having the maximum energy by a secondary sub-band signal and encodes the other sub-band signals having large amounts of energy with respect to other secondary sub-band signals. As a result, the input image signal can be effectively transferred.

According to the conventional image processing system as previously described, the image signal is divided into sub-band signals and the sub-band signals are quantized on the basis of their signal levels so that the quantized sub-band signals can be desirably transferred. In the conventional method, however, when the number of the sub-band signals is increased, the method can not be adopted effectively for processing the increased number of sub-band signals.

SUMMARY OF THE INVENTION

The present invention was motivated by a desire to provide circuitry and a corresponding method whereby the number of sub-bands of an image signal to be encoded and transferred is appropriately selected in accordance with the range of the transfer bandwidth in order to transfer the image signal via a transfer channel having a predetermined channel capacity or bandwidth.

The principle object of the present invention is to provide an apparatus for adaptively selecting three-dimensional sub-band signals, wherein the energy of each sub-band of the three-dimensional sub-band signals is obtained for extracting sub-band information on the basis of the activities of the respective higher frequency sub-bands, and a predetermined number of the higher energy sub-band signals are selected and transferred according to the extracted information.

Another object of the present invention is to provide a method for adaptively selecting three-dimensional sub-band signals, wherein the energy of each of the sub-bands of the three-dimensional sub-band signals is obtained and employed in extracting sub-band information based on the activities of the higher frequency sub-bands, and a predetermined number of the higher frequency sub-band signals are selected and transferred according to the extracted information.

These and other objects, features and advantages of the present invention are achieved by a method for adaptively selecting three-dimensional sub-band image signal. The method advantageously comprises the steps of: dividing an image signal into sub-band signals with respect to a horizontal direction, a vertical direction and time and mapping the divided sub-band signals into blocks; extracting sub-band information according to the energies and the activities of the mapped sub-band signals and detecting filter bank selection data for predicting the properties of the sub-band signals and selecting a predetermined number of the sub-band block signals mapped according to the filter bank selection data.

These and other objects, features and advantages of the present invention are provided by circuitry including an encoder and a decoder for adaptively selecting three-dimensional sub-band signals. The encoder comprises: a QMF bank for dividing a digital image signal into sub-band signals with respect to a horizontal direction, a vertical direction and time; a block mapper for mapping the sub-band signals produced by the QMF bank into sub-band block signals, each having a relatively small size; a band information extracting circuit for extracting sub-band information according to the energy and the activity of the sub-band block signals and producing filter bank selection data for predicting properties of the sub-band signals on the basis of the extracted sub-band information. Preferably, the circuit further comprises: a first memory storing a look-up table for generating output data in the form of a first control signal for enabling selection of a predetermined number of the sub-band block signals depending upon the filter bank selection data output from the band information extracting circuit; a multiplexer for providing selected sub-band block signals from the block mapper based on the first control signal from the first memory; and an additional processing circuit for processing the selected sub-band block signals from the multiplexer to maximize the efficiency of the image processing system and for transferring the processed sub-band block signals.

The apparatus according to the present invention advantageously includes a decoder comprising: an inverse processing circuit for inversely processing the processed sub-band block signals from the encoder for detecting the selected sub-band block signals and filter bank selection data; a second memory storing a look-up table for producing a second control signal based on the filter bank selection data detected by the inverse processing circuit; a demultiplexer for demultiplexing the selected sub-band block signals using the second control signal provided by the second memory to produce deselected sub-band block signals; a block demapper for generating restored sub-band signals based on the deselected sub-band block signals; and a three-dimensional QMF bank for generating a restored image signal based on the restored sub-band signals output from the block demapper.

BRIEF DESCRIPTION OF THE DRAWINGS

The above and other objects, features and advantages of the present invention will be apparent from the following description taken with reference to the accompanying drawings, in which.

DETAILED DESCRIPTION OF THE PREFERRED EMBODIMENT

A preferred embodiment of the apparatus according to the present invention will now be described in detail with reference to the Figures.

Figure 1:
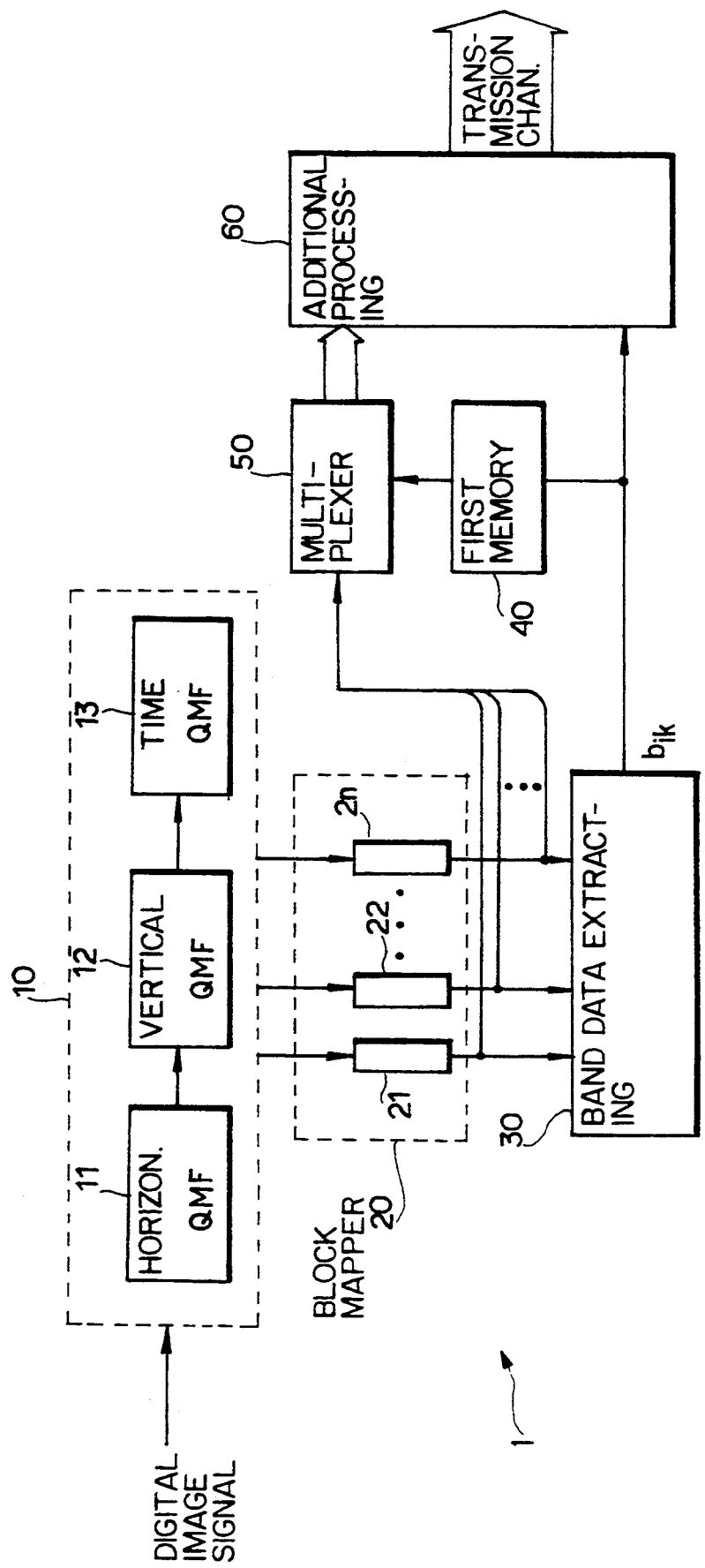
FIG. 1 is a block diagram of an encoder according to the present invention for adaptively selecting three-dimensional sub-band image signal.

Referring first to FIG. 1, there is shown a block diagram of an encoder 1 for adaptively selecting three-dimensional sub-band signals according to the present invention. A digital image signal is input to a quadrature mirror filter (QMF) bank 10, which divides the digital image signal into a plurality of sub-band signals with respect to a horizontal direction, a vertical direction and time. The sub-band signals output by QMF bank 10 are provided to a block mapper 20, which maps the sub-band signals divided by the QMF bank 10 into M×N blocks to produce sub-band block signals, each of which has a relatively small block size. A band information (data) extractor 30 extracts sub-band data according to the energies and the activities of the sub-band block signals input from block mapper 20 and produces filter bank selection data for predicting properties of the sub-band signals on the basis of the extracted sub-band information. The filter bank selection data is input to a first memory 40 storing a look-up table for producing output data in the form of a first control signal for enabling selection of a predetermined number of the sub-band block signals depending upon the filter bank selection data output from the band data extractor 30. Preferably, a multiplexer 50 selectively outputs the sub-band block signals from block mapper 20 on the basis of the first control signal from first memory 40.

Encoder 1 advantageously includes an additional processing circuit 60 for processing the sub-band block signals selected by the multiplexer 50 to maximize the efficiency of the image processing system and for transferring the processed sub-band block signals. More detailed descriptions of the band data extractor 30 and the additional processing circuit 60 are provided below.

In the circuit constructed as shown in FIG. 1, when the digital image signal is entered to the QMF bank 10, the image signal is divided into a plurality of sub-band signals by horizontal QMF 11, vertical QMF 12 and time QMF 13, which advantageously are included in QMF bank 10. The divided sub-band signals are then mapped into M×N blocks by block mapper 20, which preferably includes N block mappers 21 to $2n$, to produce sub-band block signals.

The sub-band block signals mapped into M×N blocks are supplied from the block mapper 20 to the band data extractor 30 for obtaining sub-band information according to the energy and activity of the respective sub-band block signals. It will be appreciated that band data extractor 30 makes it possible to identify the properties of each of the sub-band signals.

Consequently, filter bank selection data $b_{ik}$ is output from the band data extractor 30 depending on the properties of the sub-band block signals. The selection data $b_{ik}$ is entered to the first memory 40 storing a look-up table including data related to the selected band. Thus, the first control signal corresponding to the filter bank selection data $b_{ik}$ produced by band data extractor 30 is produced by the first memory 40 and supplied to the multiplexer 50, which selectively conveys a predetermined number of the sub-band block signals input from the block mapper 20 on the basis of the first control signal from first memory 40.

Preferably, the selection data $b_{ik}$ from the band data extractor 30 and the selected sub-band block signals output from the multiplexer 50 are provided to the additional processing circuit 60, which processes the selected sub-band block signals to increase the level of the high frequency components of the sub-band block signals to a predetermined ratio and then transfers the processed sub-band block signals through a transmission channel. In other words, the high frequency components of the selected sub-band block signals are generally low in level, so the additional processing circuit 60 adaptively modulates the selected sub-band block signals to increase the level of the selected sub-band block signals and then transmits these processed sub-band block signals.

It should be noted that the filter bank selection data $b_{ik}$ is sensitive to an error in the channel occurring during signal transfer, so an error correction code advantageously may be added If to the data $b_{ik}$ to be transferred. Furthermore, it should be noted that various other additional processes well known to those of ordinary skill in the art advantageously can be employed depending on the transfer channel capacity as well as the purpose of the data being transferred.

Figure 2:
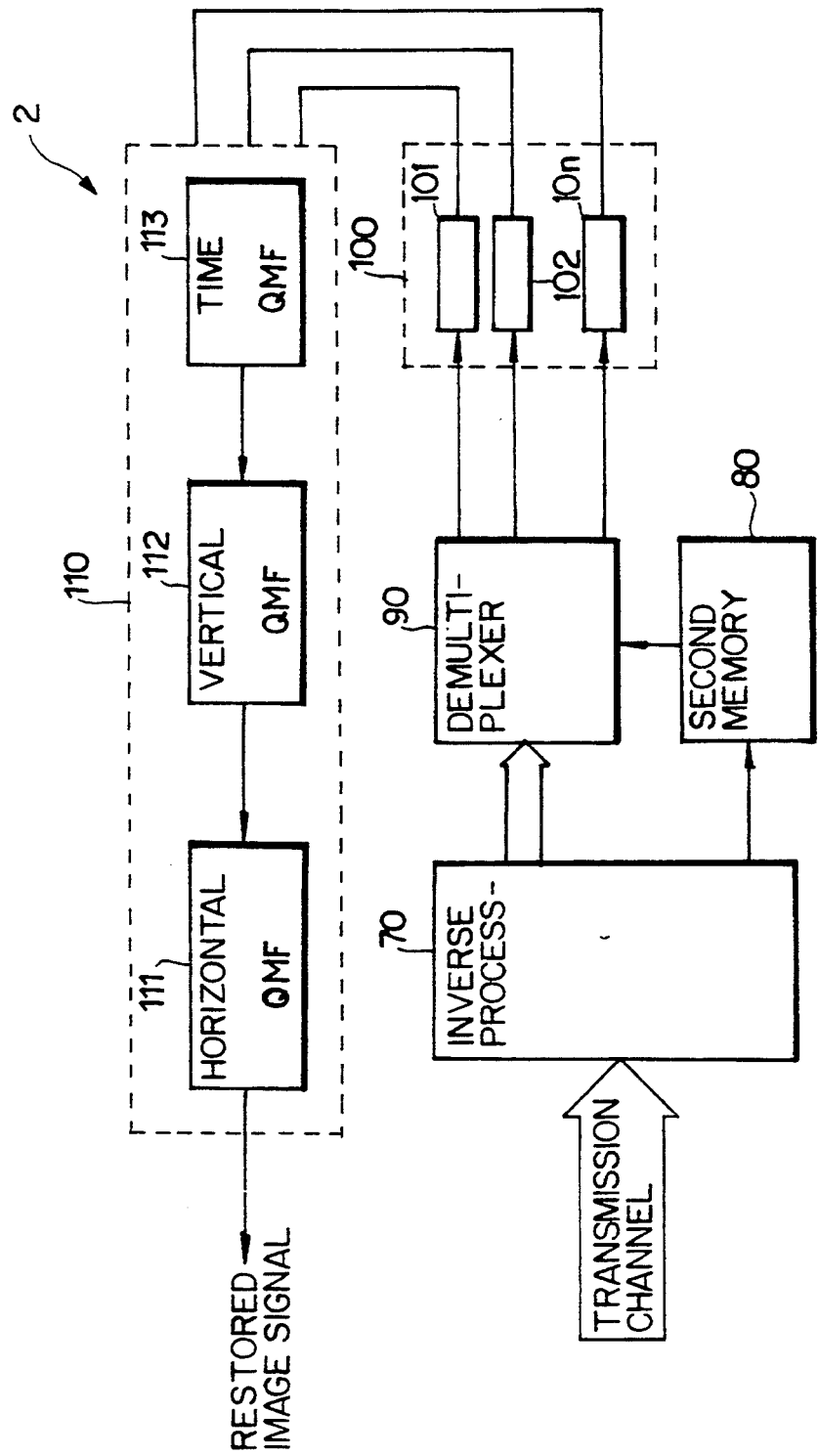
FIG. 2 is a block diagram of a decoder according to the present invention for adaptively selecting three-dimensional image signal.

Referring now to FIG. 2, there is shown a decoder 2 according to the present invention for adaptively selecting the three-dimensional image signal, wherein an inverse processing circuit 70 receiving the output processed sub-band block signals and filter selection data $b_{ik}$ from encoder 1 inversely processes the processed sub-band block signals to detect the selected sub-band block signals and filter bank selection data $b_{ik}$. A second memory 80 storing a look-up, table produces a second control signal on the basis of the filter bank selection data $b_{ik}$ detected by the inverse processing circuit 70 and provides the second control signal to a demultiplexer 90, which advantageously demultiplexes the selected sub-band block signals in response to the second control signal from the second memory 80 to produce deselected sub-band block signals. A block demapper 100 is advantageously provided for generating restored sub-band block signals based on the output from the demultiplexer 90 corresponding to the sub-band block signals. Preferably, a three-dimensional QMF bank 110 is provided for converting restored sub-band block signals output from the block demapper 100 to produce a restored image signal corresponding to the original image signal.

In the circuit constructed as described, when the signal transmitted via the transmission channel from the encoder 1 shown in FIG. 1 is input to the decoder 2, the inverse processing circuit 70 inversely processes the processed sub-band block signals to obtain the selected sub-band block signals and filter bank selection data $b_{ik}$. The filter bank selection data $b_{ik}$ obtained by the inverse processing circuit 70 is input to second memory 80, which produces the second control signal from the look-up table registered therein in accordance with the filter bank selection data $b_{ik}$. The control signal is then supplied to the demultiplexer 90, which arranges the selected sub-band block signals from the inverse processing circuit 70 into positions corresponding to the original order of the blocks based on the second control signal supplied from second memory 80. It will be noted that the multiplexer 90 allows "0" data to be input to the sub-band blocks when the corresponding sub-band block signals were previously not selected in encoder 1. Moreover, it will be appreciated that the look-up table of second memory 80 includes data similar to the look-up table of first memory 40.

The deselected sub-band block signals rearranged into their original positions by the demultiplexer 90 are then used to generate restored sub-band signals by means of the block demapper 100 and then the restored sub-band signals are converted to a restored image signal corresponding to the original image signal by the three-dimensional QMF bank 110. Preferably, QMF bank 110 includes horizontal QMF 111, vertical QMF 112 and time QMF 113.

Figure 3:
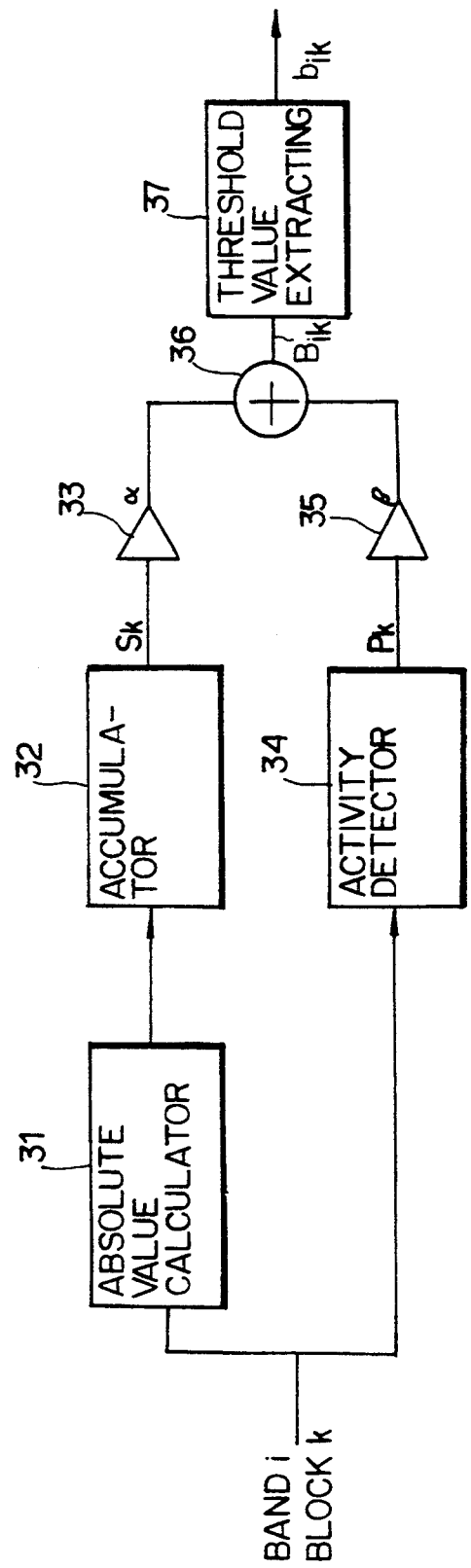
FIG. 3 is a detailed block diagram of a band information extracting circuit shown in FIG. 1.

Next, FIG. 3 shows a block diagram of the band data extractor 30 of the encoder 1 shown in FIG. 1, wherein an absolute value calculator 31, for calculating an absolute value of the $k^{th}$ block signal of the $i^{th}$ band, an accumulator 32 for accumulating the output signal of the absolute value calculator 31, and a first amplifier 33 for amplifying the output signal of the accumulator 32 are serially connected to one another in that order. Preferably, band data extractor 30 also includes activity detector 34 for detecting activity of the $k^{th}$ block signal of the $i^{th}$ band and a second amplifier 35 for amplifying the activity signal detected by the activity detector 34, which are serially connected to one another in that order. First amplifier 33 and second amplifier 35 are advantageously connected to an adder 36 for adding the output signals of the first and second amplifiers 33 and 35. The output adder 36 is provide to a threshold value detector 37 for detecting threshold value from the output signal of the adder and extracting the band data.

For the $k^{th}$ block signal of the $i^{th}$ sub-band among the sub-band block signals output from the block mapper 20 in the encoder 1 shown in FIG. 1 entered into the band data extractor 30, the energy Sk and the activity Pk of the block are defined by equations as follows:

$$Sk = \sum_{i=1}^{M} \sum_{j=1}^{N} |P(i,j)| \quad (1)$$

$$Pk = MAX - MIN \quad (2)$$

where, M and N denote the size of the block, and P(i, j) denotes a pixel value of the block.

It will be apparent from the equations that the energy Sk is defined by the summed absolute values of the respective pixels, which can be obtained by calculating the absolute value of each pixel using the absolute value calculator 31 and accumulating the absolute values of the pixels by means of the accumulator 32.

The activity Pk is obtained by the activity detector 34 and is defined by a difference between the maximum value MAX and the minimum value MIN of the pixels in the block. It will be apparent that the activity Pk is large in the vicinity of an edge or in a motion image area of the image signal. It will also be noted that the energy and activity must be defined because the energy of the lower frequency sub-band is high while that of the higher frequency sub-band is small. However, it will be appreciated that the higher frequency portion, for example, the edge or motion area of the image, is readily observed by the human eye. Accordingly, the activity at the edge or interface of the image is large even if the energy of the whole block is small.

For this reason, the energy Sk and the activity Pk are amplified by the first and second amplifiers 33 and 35 and, the amplified signals Sk and Pk are added to each other by the adder 36. Added data $B_{ik}$ for each sub-band block signal can be expressed as follows:

$$B_{ik} = \delta Sk + \beta Pk \quad (3)$$

where the terms "$\delta$" and "$\beta$" are scaling factors. From equation (2) it will be appreciated that if the sub-band block signal data $B_{ik}$ is large, it is possible to select the $i_{th}$ sub-band block. In an exemplary case, the term "$\delta$" is preferably set to be in a range of about $1/(M \times N)$ of the term "$\beta$".

Consequently, the threshold value extracting circuit 37 compares the input sub-band block data $B_{ik}$ with a threshold value Ti and outputs the selection data $b_{ik}$ obtained by the relationship:

$$b_{ik} = 1 \text{ if } B_{ik} > Ti \text{ 0 otherwise} \quad (4)$$

It will be apparent from expression (4) that when the selection data $b_{ik}$ is "1" this means that the energy or the activity of the sub-band block is sufficiently large to warrant selection.

Figure 4:
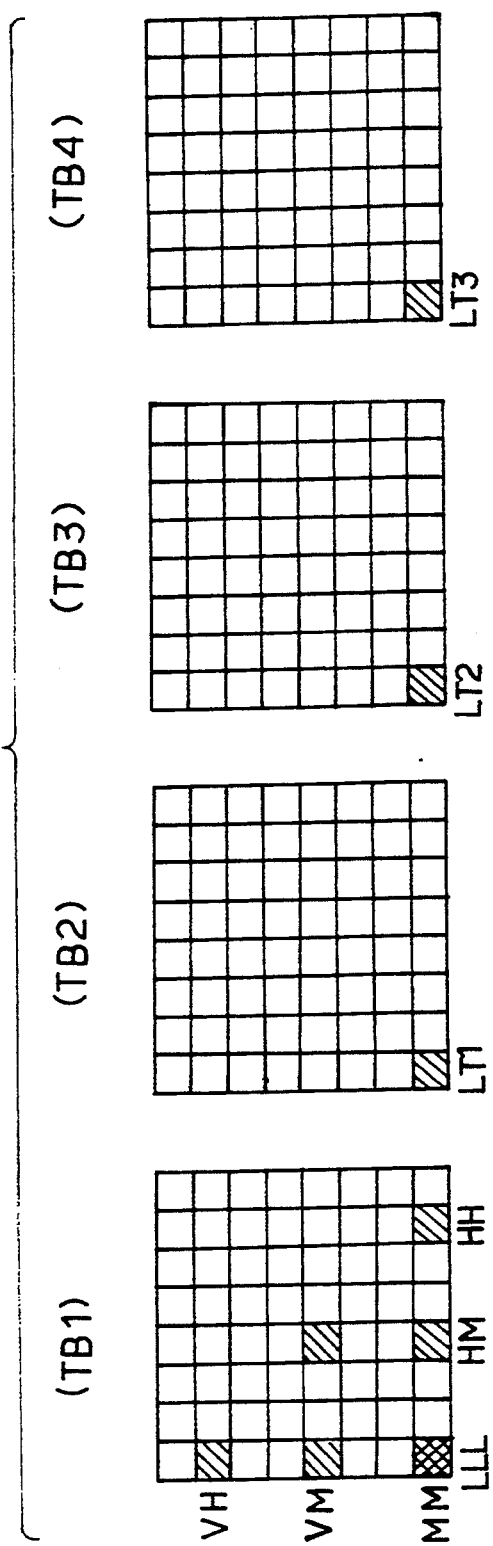
FIG. 4 is an exemplary view useful in understanding a typical one of the three-dimensional sub-bands.

Referring now to FIG. 4, there is shown an exemplary view illustrating a typical one of the three-dimensional sub-bands, which is a sub-band 8×8×4 in size. In FIG. 4, it is assumed that the bands have the specified selection data $b_{ik}$ is denoted by the areas labeled HM, HH, VM, VH, MM, LT1, LT2 and LT3. In an exemplary case, when the pixel signal is concentrated in medium frequency sub-band with respect to the horizontal direction, HM is set to "1". When the pixel signal is concentrated in the high frequency sub-band with respect to the horizontal direction, HH is set to "1". Similarly, when the pixel signal is distributed in medium frequency sub-band with respect to the vertical direction, VM is set to "1". When the pixel signal is distributed in the high frequency sub-band in the vertical direction, VH is set to "1". Alternatively, when the pixel signal is present in the medium frequency sub-band in both the horizontal and vertical directions, MM is set to "1".

In addition, the data corresponding to movement on the time axis can be predicted from the LT1, LT2 and LT3 values, making it possible to determine whether motion is contained in the picture image. In an exemplary case, when LT2 is set to "1" or LT3 is set to be "1", it means that the picture image has a medium motion or large motion.

Figure 5:
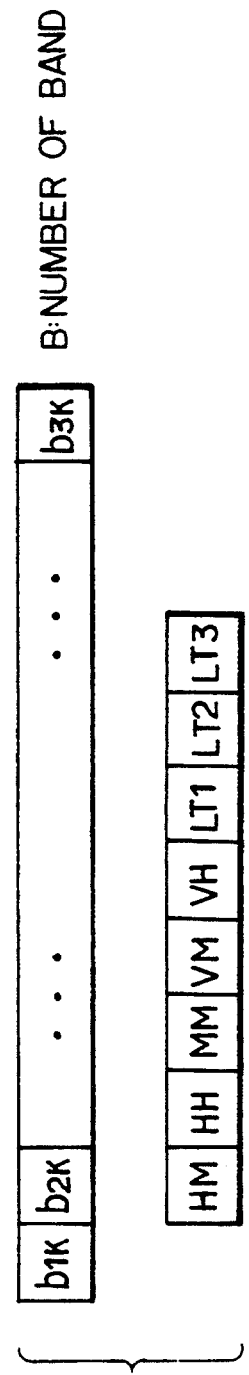
FIG. 5 is an exemplary illustration useful in understanding the information extracted by the band information extracting circuit shown in FIG. 3.

The filter bank selection data for the sub-band block signals can best be illustrated in a form of bit map which divides the properties of the respective sub-bands. FIG. 5 shows a view illustrating an exemplary bit map formed with the data extracted from the sub-band block signals by the band data extractor 30 shown in FIG. 3, which contains 8 bits so as to divide the properties of the respective sub-band blocks into $2^8(=256)$. Accordingly, it will be noted that the specified sub-bands, as shown in FIG. 4, are looked upon as the typical bands which enable determination of the properties of the entire sub-band signals. In addition, since a large number of the sub-band signals are selected, it allows minute determination of the properties of the sub-band signals.

As described above, according to the present invention, the bit map is previously prepared with respect to a large number of picture signals and the filter band selection data are stored in the look-up table on the basis of the bit map in a form similar to the original picture image. Accordingly, an algorithm for selecting the filter bank outputs can be effectively obtained without comparing the magnitude of the energies of the whole bands. Also, when the number of the sub-bands are increased, the sub-bands can be selectively transferred in accordance with the limitations imposed by the transfer bandwidth. As a result, the image signal can be transferred through the transfer channel having a constant channel capacity and bandwidth.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed:

1. In an image processing system, an apparatus for adaptively selecting three-dimensional sub-band signals, said apparatus comprising:

an encoder, said encoder further comprising:
a filter bank for dividing a digital image signal into sub-band signals with respect to a horizontal direction, a vertical direction and time;
a block mapper for mapping the sub-band signals into blocks to produce sub-band block signals, wherein each of said blocks has a relatively small size;
a band data extracting circuit for extracting sub-band data according to energy and activity of the sub-band block signals and producing filter bank selection data for predicting properties of the sub band signals on the basis of extracted sub-band information;
a first memory storing a first look-up table for providing a first control signal enabling selection of a predetermined number of the sub-band signals depending upon the filter bank selection data output from the band data extracting circuit;
a multiplexer transmitting the sub-band block signals from the block mapper as selected sub-band block signals on the basis of the first control signal from the first memory; and
an additional processing circuit for processing the selected sub-band block signals from the multiplexer so as to optimize efficiency of the image processing system and for transferring processed sub-band block signals;
a decoder, said decoder further comprising:
an inverse processing circuit for inversely processing the processed sub-band block signals from the encoder and detecting the selected sub-band block signals and said filter bank selection data;
a second memory storing a look-up table for producing a second control signal on the basis of the filter bank selection data detected by the inverse processing circuit;
a demultiplexer for demultiplexing the selected sub-band block signals to produce deselected sub-band block signals in response to the second control signal provided by the second memory;
a block demapper for generating restored sub-band signals based on the deselected sub-band block signals output by the demultiplexer; and
a three-dimensional filter bank for generating a restored image signal based on the restored sub-band signals output from the block demapper.

2. The apparatus according to claim 1, wherein the band data extracting circuit comprises:
an absolute value calculator for calculating a plurality of absolute values from the sub-band block signals;
an accumulator for accumulating the absolute values;
a first amplifier for amplifying a first signal output from the accumulator to produce an energy signal;
an activity detector for detecting activity of said sub-band block signals and generating an activity signal;
a second amplifier for amplifying the activity signal detected by the activity detector;
an adder for adding said energy signal and said activity signal from respective said first amplifier and said second amplifier to produce sub-band block data; and
a threshold value detector for comparing said sub-band block data with a threshold value thereby extracting the filter bank selection data.

3. The apparatus according to claim 1, wherein each of said filter bank and said three-dimensional filter bank further comprise a quadrature mirror filter.

4. In an image processing system, an apparatus for adaptively selecting three-dimensional sub-band signals, said apparatus comprising:

means for dividing an image signal into sub-band signals with respect to a horizontal direction, a vertical direction and tinge for mapping the divided sub-band signals into blocks to produce sub-band block signals;

an extractor for extracting sub-band information according to energy and activity of said sub-band block signals and generating filter bank selection data for predicting properties of the sub-band block signals;

a selector for selecting a predetermined first number of said sub-band block signals mapped according to the filter bank selection data; and a look-up table, wherein said selector selects said predetermined first number of said sub-band block signals in response to a control signal generated from said look-up table in response to the filter bank selection data.

5. The apparatus for adaptively selecting three-dimensional sub-band signals of claim 4, further comprising an additional processing circuit for amplifying a predetermined second number of said predetermined first number of said sub-band block signals.

6. The apparatus for adaptively selecting three-dimensional sub-band signals of claim 4, further comprising an additional processing circuit for adding said sub-band information to said first number of said sub-band block signals and transmitting said first number of sub-band block signals and said sub-band information.

7. A method for adaptively selecting three-dimensional sub-band signals, said method comprising the steps of:

dividing an image signal into sub-band signals with respect to a horizontal direction, a vertical direction and time and mapping the divided sub-band signals into blocks to produce sub-band block signals;

extracting sub-band information according to energy and activity of the sub-band block signals and detecting filter bank selection data for predicting properties of the sub-band block signals; and selecting a predetermined first number of said sub-band block signals mapped in response to a control signal generated from a look-up table according to the filter bank selection data.

8. The method for adaptively selecting three-dimensional sub-band signals of claim 7, said method further comprising the step of amplifying a predetermined second number of said predetermined first number of said sub-band block signals.

9. The method for adaptively selecting three-dimensional sub-band signals of claim 8, said method further comprising the step of adding said sub-band information to said predetermined first number of said sub-band block signals and transmitting said predetermined first number of sub-band block signals and said sub-band information.

* * * * *